US011722891B2

(12) United States Patent
Nair et al.

(10) Patent No.: US 11,722,891 B2
(45) Date of Patent: Aug. 8, 2023

(54) USER AUTHENTICATION IN FIRST NETWORK USING SUBSCRIBER IDENTITY MODULE FOR SECOND LEGACY NETWORK

(71) Applicant: Nokia Technologies Oy, Espoo (FI)

(72) Inventors: Suresh Nair, Whippany, NJ (US); Anja Jerichow, Grafing bei München (DE); Nagendra S Bykampadi, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 275 days.

(21) Appl. No.: 17/043,971

(22) PCT Filed: Apr. 4, 2019

(86) PCT No.: PCT/EP2019/058535
§ 371 (c)(1),
(2) Date: Sep. 30, 2020

(87) PCT Pub. No.: WO2019/193107
PCT Pub. Date: Oct. 10, 2019

(65) Prior Publication Data
US 2021/0120409 A1      Apr. 22, 2021

(30) Foreign Application Priority Data

Apr. 5, 2018   (IN) .............................. 201841013100

(51) Int. Cl.
*H04W 12/06* (2021.01)
*H04W 12/40* (2021.01)
*H04W 12/04* (2021.01)

(52) U.S. Cl.
CPC ........... *H04W 12/06* (2013.01); *H04W 12/04* (2013.01); *H04W 12/40* (2021.01)

(58) Field of Classification Search
CPC ..... H04W 12/06; H04W 12/04; H04W 12/40; H04L 9/0844
See application file for complete search history.

(56) References Cited

U.S. PATENT DOCUMENTS 8,572,698 B1 * 10/2013 Kandasamy .......... H04W 84/06
370/328
2011/0246777 A1 * 10/2011 Buckley ................ H04W 12/08
713/172

(Continued)

OTHER PUBLICATIONS

Arkko, Jari; Norrman, Karl; Näslund, Mats; Sahlin, Bengt; "A USIM Compatible 5G AKA Protocol with Perfect Forward Secrecy," 2015 IEEE Trustcom/BigDataSE/ISPA, Helsinki, Finland, 2015, pp. 1205-1209, doi: 10.1109/Trustcom.2015.506.*

(Continued)

*Primary Examiner* — Victor Lesniewski
(74) *Attorney, Agent, or Firm* — Ryan, Mason & Lewis, LLP

(57) ABSTRACT

In given user equipment seeking access to a first communication network (e.g., 5G network), wherein the given user equipment comprises a subscriber identity module (e.g., USIM) configured for a second communication network, and wherein the second communication network is a legacy network with respect to the first communication network (e.g., legacy 4G network), a method includes: initiating an authentication procedure with at least one network entity of the first communication network and selecting an authentication method to be used during the authentication procedure; and participating in the authentication procedure with the at least one network entity using the selected authentication method and, upon successful authentication, the given user equipment obtaining a set of keys to enable the given user equipment to access the first communication network.

20 Claims, 7 Drawing Sheets

(56) References Cited

U.S. PATENT DOCUMENTS

| | | | | |
|---|---|---|---|---|
| 2015/0304846 | A1* | 10/2015 | Wallis | H04W 12/04 |
| | | | | 455/411 |
| 2018/0176768 | A1* | 6/2018 | Baek | H04W 8/183 |
| 2018/0352528 | A1* | 12/2018 | Kunz | H04M 15/8038 |
| 2019/0191309 | A1* | 6/2019 | Kweon | H04L 9/32 |
| 2019/0261178 | A1* | 8/2019 | Rajadurai | H04W 12/069 |
| 2019/0268335 | A1* | 8/2019 | Targali | H04L 9/0643 |
| 2019/0268753 | A1* | 8/2019 | Chen | H04W 76/11 |
| 2019/0274038 | A1* | 9/2019 | Wu | H04W 36/0033 |
| 2019/0380068 | A1* | 12/2019 | Jost | H04W 36/0038 |
| 2020/0281031 | A1* | 9/2020 | Wang | H04W 12/041 |

OTHER PUBLICATIONS

Lauridsen, Mads; Gimenez, Lucas Chavarria; Rodriguez, Ignacio; Sorensen, Troels B.; Mogensen, Preben; "From LTE to 5G for Connected Mobility," in IEEE Communications Magazine, vol. 55, No. 3, pp. 156-162, Mar. 2017, doi: 10.1109/MCOM.2017.1600778CM.*

"3rd Generation Partnership Project; Technical Specification Group Services and System Aspects;Security architecture and procedures for 5G system(Release 15)", 3GPP TS 33.501, V1.0.0, Mar. 2018, pp. 1-128.

"Support Legacy USIM in 5G", 3GPP TSG-SA WG1 Meeting #81, S1-180500, China Mobile, Feb. 5-9, 2018, 4 pages.

"3rd Generation Partnership Project; Technical Specification Group Services and System Aspects; 3GPP System Architecture Evolution (SAE); Security architecture (Release 15)", 3GPP TS 33.401, V15.2.0, Jan. 2018, pp. 1-163.

"3rd Generation Partnership Project; Technical Specification Group Core Network and Terminals; Numbering, addressing and identification (Release 15)", 3GPP TS 23.003, V15.2.0, Dec. 2017, pp. 1-116.

"3rd Generation Partnership Project; Technical Specification Group Services and System Aspects; 3G Security; Security architecture (Release 14)", 3GPP TS 33.102, V14.1.0, Mar. 2017, pp. 1-77.

"3rd Generation Partnership Project; Technical Specification Group Services and System Aspects; Procedures for the 5G System; Stage 2 (Release 15)", 3GPP TS 23.502, V15.0.0, Dec. 2017, pp. 1-258.

Dekok, "The Network Access Identifier", RFC 7542, Internet Engineering Task Force (IETF), May 2015, pp. 1-30.

"3rd Generation Partnership Project; Technical Specification Group Services and System Aspects; System Architecture for the 5G System; Stage 2 (Release 15)", 3GPP TS 23.501, V15.0.0, Dec. 2017, pp. 1-181.

"3rd Generation Partnership Project; Technical Specification Group Services and System Aspects; Procedures for the 5G System; Stage 2 (Release 15)", 3GPP TS 23.502, V15.1.0, Mar. 2018, pp. 1-285.

"3rd Generation Partnership Project; Technical Specification Group Services and System Aspects;Security architecture and procedures for 5G system (Release 15)", 3GPP TS 33.501, V0.7.0, Jan. 2018, pp. 1-109.

"3rd Generation Partnership Project; Technical Specification Group Services and System Aspects; 3GPP System Architecture Evolution (SAE); Security architecture (Release 15)", 3GPP TS 33.401, V15.3.0, Mar. 2018, pp. 1-163.

"3rd Generation Partnership Project; Technical Specification Group Core Network and Terminals; Numbering, addressing and identification (Release 15)", 3GPP TS 23.003, V15.3.0, Mar. 2018, pp. 1-118.

Indian Application No. 201841013099, "Unified Subscription Identifier Management in Communication Systems", filed on Apr. 5, 2018, 21 pages.

International Search Report and Written Opinion received for corresponding Patent Cooperation Treaty Application No. PCT/EP2019/058535, dated Jun. 18, 2019, 10 pages.

Office action received for corresponding Indian Patent Application No. 201841013100, dated Aug. 3, 2022, 7 pages.

European Search Report/Office Action issued by the European Patent Office dated Sep. 16, 2022 for European Patent Application No. 19716378.5 which is a counterpart application of U.S. Appl. No. 17/043,971, to which the current application claims priority.

* cited by examiner

| Authentication using LTE USIM | Authentication using 5G USIM |
|---|---|
| Uses LTE PLMN ID, LTE Access parameters | Uses 5G PLMN ID, 5G Access parameters |
| Uses EPS AKA (reveals IMSI during attach) | Uses 5G AKA or 5G EAP-AKA' ( can conceal subscription identifier) |
| Subscription identifier is IMSI | Subscription identifier can be, permanent subscription identifier (SUPI), concealed SUPI (SUCI) |
| EPS Key Hierarchy | 5G Key hierarchy, there are additional keys for SEAF ($K_{SEAF}$), Non 3GPP interworking function($K_{N3IWF}$) |
| UE doesn't send IMSI at the end of authentication to Serving Network | UE sends SUPI to the Serving Network at the end of Authentication while roaming to support LI |
| Home Network doesn't get UE authentication confirmation while UE is roaming | Home Network gets confirmation that UE successfully got authenticated in a visited Serving Network |
| Generates LTE NAS/AS key hierarchy | Slightly different key hierarchy (e.g. UP integrity key $K_{UPint}$ is new , Keys for multiple NAS connections new) |

FIG. 3

USER AUTHENTICATION IN FIRST NETWORK USING SUBSCRIBER IDENTITY MODULE FOR SECOND LEGACY NETWORK

RELATED APPLICATION

This application claims priority to PCT Application No. PCT/EP2019/058535, filed on Apr. 4, 2019, which claims priority to Indian Application No. 201841013100, filed on Apr. 5, 2018, each of which is incorporated herein by reference in its entirety.

FIELD

The field relates generally to communication systems, and more particularly, but not exclusively, to authentication operations within such systems.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point referred to as a gNB in a 5G network. The UE contains at least one Universal Subscriber Identity Module (USIM) and appropriate application software. The USIM securely stores the permanent subscription identifier and its related key, which are used to identify and authenticate subscribers to the 5G network. The access point (e.g., gNB) is illustratively part of an access network of the communication system. For example, in a 5G network, the access network is referred to as a 5G System and is described in 3GPP Technical Specification (TS) 23.501, V15.0.0, entitled "Technical Specification Group Services and System Aspects; System Architecture for the 5G System," the disclosure of which is incorporated by reference herein in its entirety. In general, the access point (e.g., gNB) provides access for the UE to a core network (CN), which then provides access for the UE to other UEs and/or a data network such as a packet data network (e.g., Internet). Furthermore, 5G network access procedures are described in 3GPP Technical Specification (TS) 23.502, V15.1.0, entitled "Technical Specification Group Services and System Aspects; Procedures for the 5G System," the disclosure of which is incorporated by reference herein in its entirety. Still further, 3GPP Technical Specification (TS) 33.501, V0.7.0, entitled "Technical Specification Group Services and System Aspects; Security Architecture and Procedures for the 5G System," the disclosure of which is incorporated by reference herein in its entirety, further describes security management details associated with a 5G network.

It is realized that a UE configured with a legacy (LTE) USIM may seek to access the 5G network. However, access in such a scenario can present significant challenges.

SUMMARY

Illustrative embodiments provide techniques for performing authentication of user equipment in a first (current) network using a subscriber identity module for a second (legacy) network. While the techniques are particularly well suited for scenarios where user equipment configured with a 4G (LTE) USIM (legacy USIM) seeks access to a 5G network (current network), alternative embodiments are contemplated for other current and legacy network scenarios.

For example, in one illustrative embodiment, a method comprises the following step. In given user equipment seeking access to a first communication network (e.g., 5G network), wherein the given user equipment comprises a subscriber identity module (e.g., USIM) configured for a second communication network, and wherein the second communication network is a legacy network with respect to the first communication network (e.g., legacy 4G LTE network), the method comprises: initiating an authentication procedure with at least one network entity of the first communication network and selecting an authentication method to be used during the authentication procedure; and participating in the authentication procedure with the at least one network entity using the selected authentication method and, upon successful authentication, the given user equipment obtaining a set of keys to enable the given user equipment to access the first communication network.

Further illustrative embodiments are provided in the form of non-transitory computer-readable storage medium having embodied therein executable program code that when executed by a processor causes the processor to perform the above steps. Still further illustrative embodiments comprise apparatus with a processor and a memory configured to perform the above steps.

Advantageously, illustrative embodiments provide techniques for enabling given user equipment that is configured with a 4G (LTE) or legacy USIM to select the 5G network during an access request, and then enabling the 5G network to be able to authenticate the given user equipment using the legacy USIM.

These and other features and advantages of embodiments described herein will become more apparent from the accompanying drawings and the following detailed description.

BRIEF DESCRIPTION OF THE DRAWINGS

FIG. 3 illustrates differences between an LTE authentication procedure and a 5G authentication procedure.

DETAILED DESCRIPTION

Embodiments will be illustrated herein in conjunction with example communication systems and associated techniques for providing authentication and other procedures in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) may provide further explanation of network elements/functions and/or operations that may interact with parts of the inventive solutions, e.g., the above-referenced 3GPP TS 23.501, 23.502 and 33.501. Other 3GPP TS/TR documents may provide other conventional details that one of ordinary skill in the art will realize. However, while well suited for 5G-related 3GPP standards, embodiments are not necessarily intended to be limited to any particular standards.

Illustrative embodiments are related to authentication procedures that enable a UE with an LTE USIM to access a 5G network. Prior to describing such illustrative embodiments, a general description of main components of a 5G network will be described below in the context of FIGS. 1 and 2.

Figure 1:
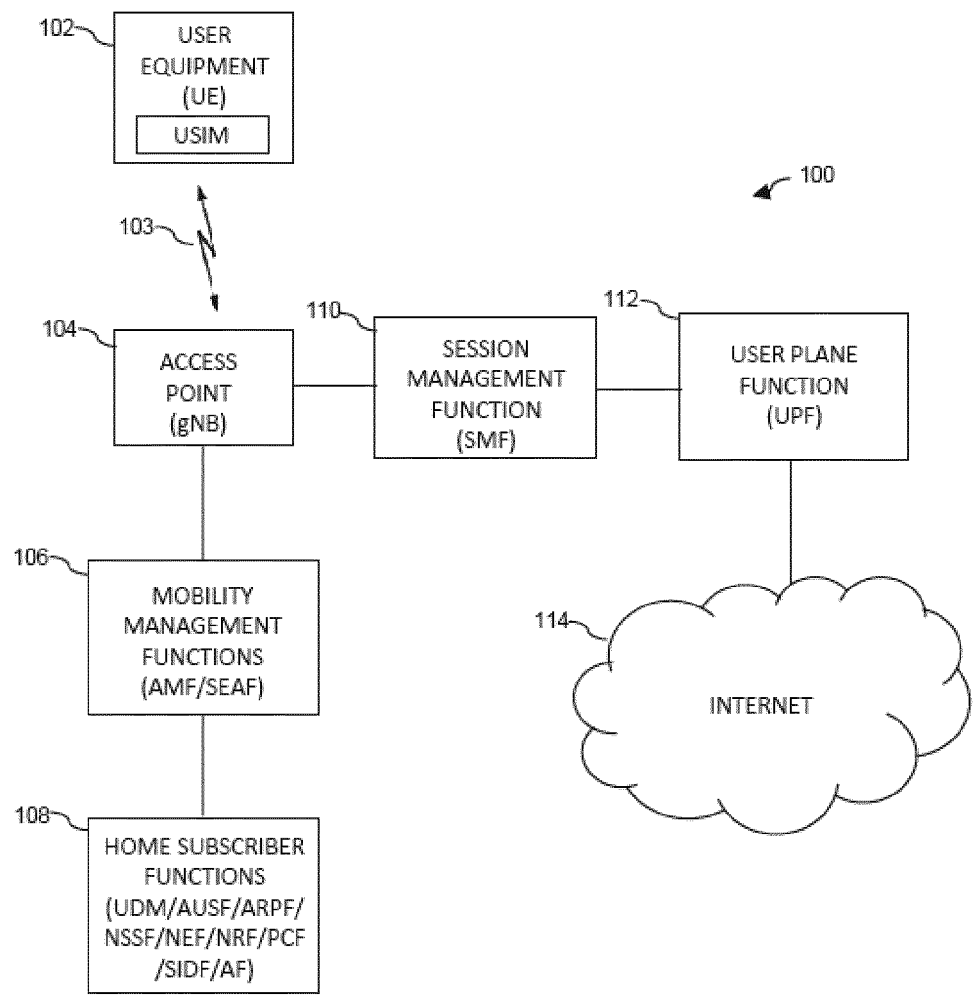
FIG. 1 illustrates a communication system with which one or more illustrative embodiments may be implemented.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements may be used to implement some or all of the main functions represented. Also, it is to be understood that not all functions of a 5G network are depicted in FIG. 1. Rather, functions that facilitate an explanation of illustrative embodiments are represented. Subsequent figures may depict some additional elements/functions.

Accordingly, as shown, communication system 100 comprises user equipment (UE) 102 that communicates via an air interface 103 with an access point (gNB) 104. The UE 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM (as illustrated in FIG. 1 as part of UE 102) securely stores the permanent subscription identifier and its related key, which are used to identify and authenticate subscribers to access networks. The ME is the user-independent part of the UE and contains terminal equipment (TE) functions and various mobile termination (MT) functions.

The access point 104 is illustratively part of an access network of the communication system 100. Such an access network may comprise, for example, a 5G System having a plurality of base stations and one or more associated radio network control functions. The base stations and radio network control functions may be logically separate entities, but in a given embodiment may be implemented in the same physical network element, such as, for example, a base station router or femto cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) can also be implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF may also be referred to herein, more generally, as an access and mobility management entity.

The AMF 106 in this illustrative embodiment is operatively coupled to home subscriber functions 108, i.e., one or more functions that are resident in the home network of the subscriber. As shown, some of these functions include the Unified Data Management (UDM) function, as well as an Authentication Server Function (AUSF). The AUSF and UDM (separately or collectively along with a 4G Home Subscriber Server or HSS) may also be referred to herein, more generally, as an authentication entity. In addition, home subscriber functions may include, but are not limited to, Authentication Credential Repository and Processing Function (ARPF), Network Slice Selection Function (NSSF), Network Exposure Function (NEF), Network Repository Function (NRF), Policy Control Function (PCF), Subscription Identifier De-concealing Function (SIDF and Application Function (AF).

The access point 104 is also operatively coupled to a serving gateway function, i.e., Session Management Function (SMF) 110, which is operatively coupled to a User Plane Function (UPF) 112. UPF 112 is operatively coupled to a Packet Data Network, e.g., Internet 114. Further typical operations and functions of such network elements are not described here since they are not the focus of the illustrative embodiments and may be found in appropriate 3GPP 5G documentation.

It is to be appreciated that this particular arrangement of system elements is an example only, and other types and arrangements of additional or alternative elements can be used to implement a communication system in other embodiments. For example, in other embodiments, the system 100 may comprise other elements/functions not expressly shown herein.

Accordingly, the FIG. 1 arrangement is just one example configuration of a wireless cellular system, and numerous alternative configurations of system elements may be used. For example, although only single elements/functions are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104.

Figure 2:
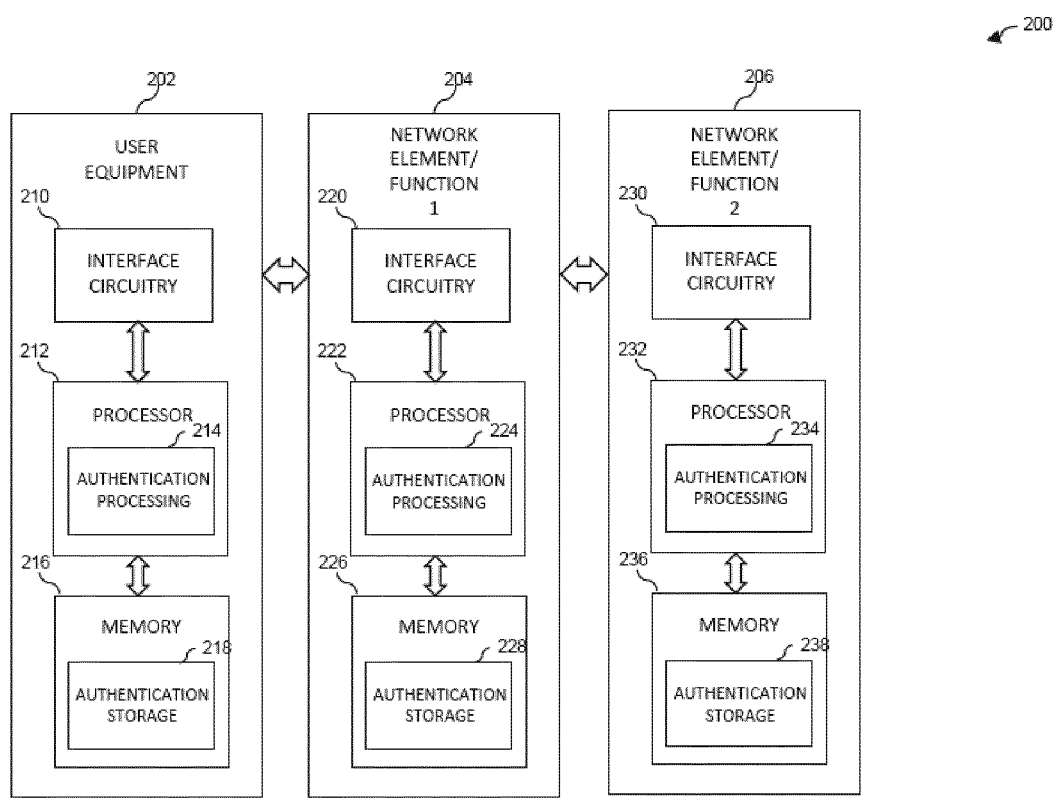
FIG. 2 illustrates user equipment and network element/functions for performing authentication procedures with which one or more illustrative embodiments may be implemented.

FIG. 2 is a block diagram of user equipment and network elements/functions for providing authentication in an illustrative embodiment. System 200 is shown comprising user equipment (UE) 202, a network element/function (1) 204 and a network element/function (2) 206. For example, in illustrative embodiments and with reference back to FIG. 1, UE 202 can represent UE 102, network element function 204 can represent one or more of the mobility management functions 106 (e.g., AMF and/or SEAF), and network element/function 206 can represent one or more of the home subscriber functions 108 (e.g., AUSF, UDM, ARPF and/or SIDF). It is to be appreciated that the UE 202 and the network elements/functions 204 and 206 are configured to provide authentication and other techniques described herein.

The user equipment 202 comprises a processor 212 coupled to a memory 216 and interface circuitry 210. The processor 212 of the user equipment 202 includes an authentication processing module 214 that may be implemented at least in part in the form of software executed by the processor. The processing module 214 performs authentication operations described in conjunction with subsequent figures and otherwise herein. The memory 216 of the user equipment 202 includes an authentication storage module 218 that stores data generated or otherwise used during authentication operations.

The network element/function 204 comprises a processor 222 coupled to a memory 226 and interface circuitry 220. The processor 222 of network element/function 204 includes an authentication processing module 224 that may be implemented at least in part in the form of software executed by the processor 222. The processing module 224 performs authentication operations described in conjunction with subsequent figures and otherwise herein. The memory 226 of network element/function 204 includes an authentication storage module 228 that stores data generated or otherwise used during authentication operations.

The network element/function 206 comprises a processor 232 coupled to a memory 236 and interface circuitry 230. The processor 232 of network element/function 206 includes an authentication processing module 234 that may be implemented at least in part in the form of software executed by the processor 232. The processing module 234 performs authentication operations described in conjunction with subsequent figures and otherwise herein. The memory 236 of network element/function 206 includes an authentication storage module 238 that stores data generated or otherwise used during authentication operations.

The processors 212, 222, and 232 of the respective user equipment 202 and network elements/functions 204 and 206 may comprise, for example, microprocessors, application-specific integrated circuits (ASICs), digital signal processors (DSPs) or other types of processing devices, as well as portions or combinations of such elements.

The memories 216, 226, and 236 of the respective user equipment 202 and network elements/functions 204 and 206 may be used to store one or more software programs that are executed by the respective processors 212, 222, and 232 to implement at least a portion of the functionality described herein. For example, authentication operations and other functionality as described in conjunction with subsequent figures and otherwise herein may be implemented in a straightforward manner using software code executed by processors 212, 222, and 232.

A given one of the memories 216, 226, or 236 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216, 226, or 236 may more particularly comprise, for example, an electronic random-access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210, 220, and 230 of the respective user equipment and network elements/functions 202, 204, and 206 illustratively comprise transceivers or other communication hardware or firmware that allows the associated system elements to communicate with one another in the manner described herein.

It is apparent from FIG. 2 that user equipment 202 and the network elements/functions 204 and 206 are configured for communication with each other via their respective interface circuitries 210, 220, and 230. This communication involves user equipment 202 sending data to and receiving data from network element/function 204, and network element/function 204 sending data to and receiving data from network element/function 206. However, in alternative embodiments, other network elements may be operatively coupled between or to the user equipment 202 and/or network elements/functions 204 and 206. The term "data" as used herein is intended to be construed broadly, so as to encompass any type of information that may be sent between network elements/functions, as well as between user equipment and such network elements/functions, including, but not limited to, identity data, key pairs, key indicators, registration request/response messages and data, authentication request/response messages and data, control data, audio, video, multimedia, other messages, etc.

It is to be appreciated that the particular arrangement of components shown in FIG. 2 is an example only, and numerous alternative configurations may be used in other embodiments. For example, any given network element/function can be configured to incorporate additional or alternative components and to support other communication protocols.

Other system elements such as gNB 104, SMF 110, and UPF 112 may each be configured to include components such as a processor, memory and network interface. These elements need not be implemented on separate stand-alone processing platforms, but could instead, for example, represent different functional portions of a single common processing platform.

Given the general concepts described above, illustrative embodiments that address scenarios wherein a UE configured with a LTE (legacy) USIM seeks to access a 5G (current) network will now be described.

In 5G networks, procedures using 5G Authentication and Key Agreement (AKA), Extensible Authentication Protocol (EAP)-AKA' and EAP Transport Layer Security (TLS) have been defined to authenticate and authorize the UE for 5G services, see the above-referenced 3GPP TS 33.501. For 5G network selection and authentication, the UE is expected to have a new 5G USIM application in the traditional removable UICC or in eUSIM. However, updating the large number of legacy LTE UEs currently deployed with an updated 5G USIM is a significant challenge, e.g., significant overhead in either discarding the current LTE USIMs or provisioning a 5G USIM in the existing UICC in a secure manner.

Thus, the challenge to be solved is how to authenticate the UE using a legacy USIM for 5G access. It is realized herein that the challenge is two-fold:

1) USIM contains network selection files, including the Public Land Mobile Network (PLMN) identifier, and network selection parameters such as frequency band, etc., typically in the $EF_{NETPAR}$ (network parameters) file. It is realized herein that this information should be matched with corresponding 5G network parameters in order to perform the network selection and authentication.

2) The authentication steps for LTE authentication (defined in 3GPP Technical Specification (TS) 33.401, V15.3.0, entitled "Technical Specification Group Services and System Aspects; 3GPP System Architecture Evolution (SAE); System Architecture", the disclosure of which is incorporated by reference herein in its entirety), and 5G authentication (defined in the above-referenced 3GPP TS 33.501) are different.

In the above-referenced TS 33.501, authenticating a UE using a legacy LTE USIM is not addressed. This challenge is also not addressed in any other Stage 3 specifications. Further, in the above-referenced TS 33.401, only authentication using International Mobile Subscriber Identity (IMSI) is defined. The structure of the IMSI is defined in 3GPP Technical Specification (TS) 23.003, V15.3.0, entitled "Technical Specification Group Core Network and Terminals; Numbering, Addressing and Identification," the disclosure of which is incorporated by reference herein in its entirety, as consisting of 15 digits, constructed with three parts including MCC (3 digits)+MNC (2/3 digits)+MSIN (10/9 digits).

Accordingly, illustrative embodiments provide solutions for each of the above and other challenges.

To address the first aspect of the above-mentioned two-fold challenge, illustrative embodiments configure the UE (that has the legacy LTE USIM) to select the 5G network. The USIM file, $EF_{NETPAR}$, contains information concerning the cell frequencies. Thus, if the 5G cell frequencies are the same as LTE frequencies or the current LTE frequencies of a network operator are re-used for 5G operation, then a UE with a legacy USIM or UICC would select the 5G gNB. The UE which consists of the ME (consisting of the radio and the hardware shell) performs the signalling for network access and authentication as defined in TS 33.501, but the UE contains an LTE USIM. If the fields in the $EF_{NETPAR}$ file do not match that of the LTE cell, a 5G UE may also be able to determine the presence of a 5G cell by scanning the radio spectrum it is capable of and select the 5G base station. Another solution to the above-mentioned network selection aspect of the problem is to utilize one or more over-the-air (OTA) mechanisms to update the current $EF_{NETPAR}$ file to 5G parameters. A given LTE OTA mechanism can secure the OTA process using the LTE credentials in the UE. With such a reframing of frequencies, this enables the UE to select a 5G gNB and initiate the authentication process.

To address the second aspect of the above-mentioned two-fold challenge, illustrative embodiments provide a 5G authentication protocol for a UE with an LTE USIM that addresses the differences in LTE authentication and 5G authentication.

With respect to available 5G authentication protocols, a comparison of the 5G AKA procedure and the LTE AKA procedure reveals that the procedures are actually very similar with few differences. The differences are illustrated in table 300 of FIG. 3.

Figure 4:
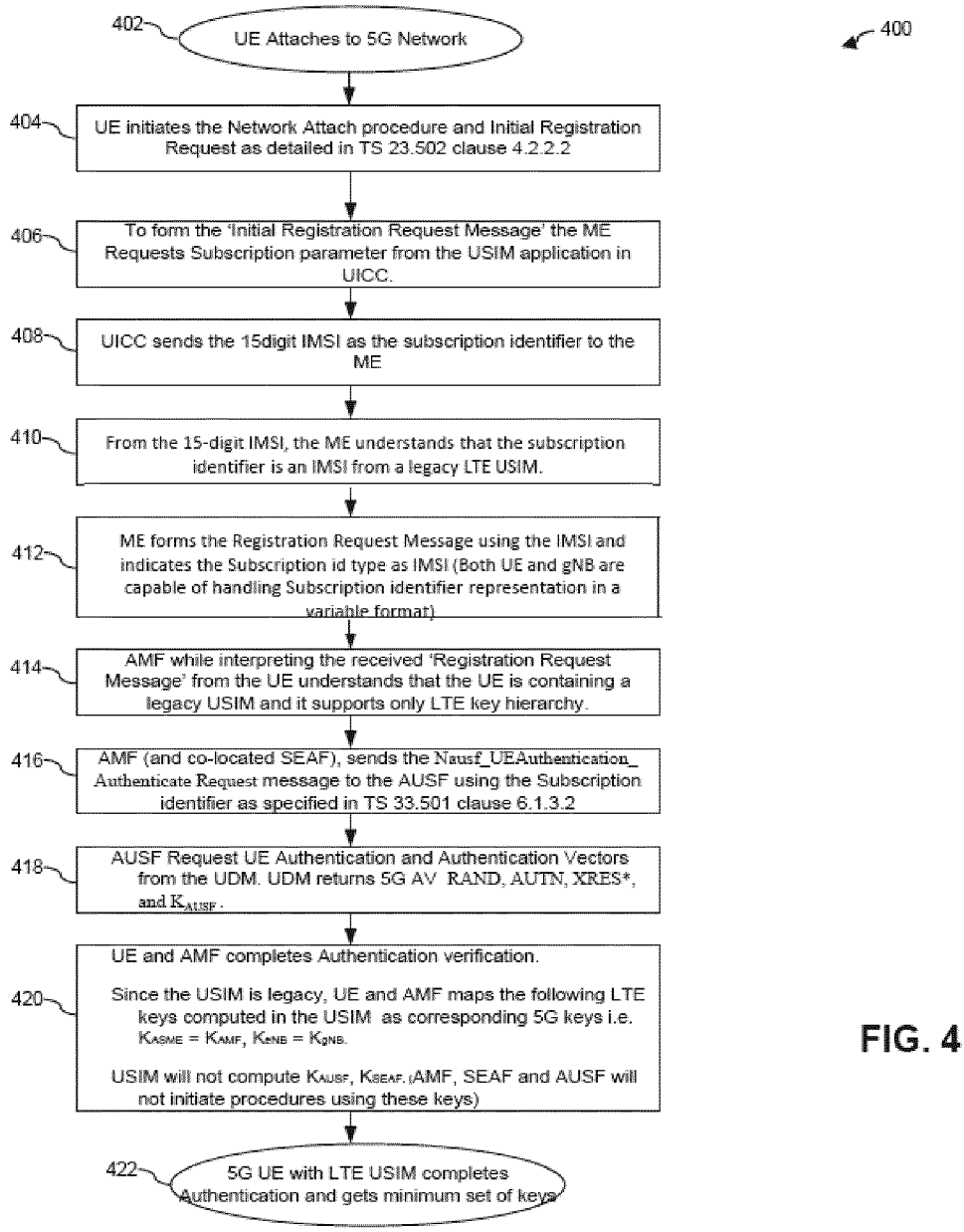
FIG. 4 illustrates an authentication procedure, according to an illustrative embodiment.

FIG. 4 illustrates a 5G authentication procedure 400 for a UE with an LTE USIM, according to an illustrative embodiment.

In step 402, a given UE with an LTE USIM attaches to a 5G network.

In step 404, the UE initiates the Network Attach procedure and Initial Registration Request as detailed in the above-referenced 3GPP TS 23.502.

In step 406, for the UE to form the Initial Registration Request message, the ME requests subscription parameters from the USIM application in the UICC.

In step 408, the UICC sends the 15-digit IMSI as the subscription identifier to the ME.

In step 410, from the 15-digit IMSI, the ME understands that the subscription identifier is a IMSI from a legacy LTE USIM. A 5G USIM formats the subscription identity either as a SUPI, NULL encrypted SUPI or as encrypted SUPI called SUCI. The ME is expected to be intelligent enough to distinguish the difference in format of the subscription identifier received from the UICC/USIM and make the conclusion whether the USIM contained in the UICC is 5G or 4G (LTE).

In step 412, the ME forms the Registration Request Message using the IMSI and indicates the Subscription identifier (id) type as IMSI. It is assumed that both the UE and gNB are capable of handling the Subscription id representation in variable representation formats used both in 5G and in LTE, i.e., either as a SUPI, NULL encrypted SUPI or as encrypted SUPI called SUCI used in 5G or as IMSI used in LTE. One non-limiting example of a variable representation format is described in U.S. patent application Ser. No. 17/045,370 entitled "Unified Subscription Identifier Management in Communication Systems," the disclosure of which is incorporated by reference herein in its entirety. Other forms of variable subscription identifiers may be employed.

In step 414, the AMF while interpreting the received Registration Request Message from the UE understands that the UE contains a legacy USIM and it supports only the LTE key hierarchy from the legacy USIM format indicated in the subscription identifier field.

In step 416, the AMF (and co-located SEAF) sends the Nausf_UEAuthentication_Authenticate_Request message to the AUSF using the Subscription identifier as specified in the above-referenced 3GPP TS 33.501.

In step 418, the AUSF recognizes the subscription identifier as IMSI and selects appropriate HSS/UDM for authenticating the UE using the EPS AKA method defined in the above-referenced 3GPP TS 33.401. AUSF requests UE Authentication and Authentication Vectors (AV) from the selected HSS/UDM. If the subscription identifier is correct, HSS/UDM returns 5G AVs RAND, AUTN, XRES*, and $K_{AUSF}$. It is to be noted that the AUSF is otherwise capable of selecting other authentication methods such as 5G AKA, 5G EAP-AKA' and 5G EAP TLS. Because of the similarities between EPS AKA and 5G AKA, a HSS/UDM would be able to authenticate the UE and a UE would be able to authenticate the network. Authentication using 5G AP-AKA' and 5G EAP TLS methods are further defined in the above-referenced 3GPP TS 33.501.

In step 420, the UE and the AUSF complete Authentication verification. Since the USIM is legacy, the UE/ME and AMF map the following keys computed in the USIM as corresponding 5G keys, i.e., $K_{ASME}=K_{AMF}$, $K_{eNB}=K_{gNB}$. Note that "=" here does not mean assignment, but rather the UE and AMF entities consider the keys mentioned as the same and equal. The USIM will not compute $K_{AUSF}$, $K_{SEAF}$ (AMF, SEAF and AUSF will not initiate procedures using these keys).

In step 422, the 5G UE with LTE USIM completes Authentication and gets minimum set of keys corresponding to its LTE key hierarchy as defined in the above-referenced 3GPP TS 33.401.

Figure 5:
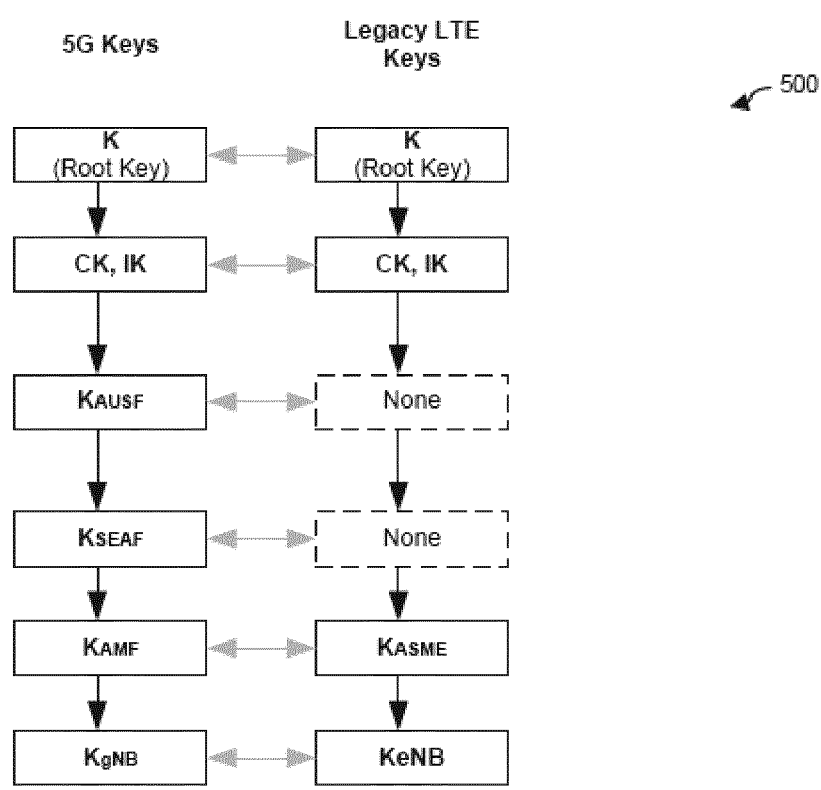
FIG. 5 illustrates a key hierarchy mapping between LTE keys and 5G keys.

Consistent with procedure 400 above, FIG. 5 illustrates a key hierarchy mapping 500 between LTE keys and 5G keys. More particularly, FIG. 5 shows a corresponding key mapping 500 for 5G UE, AMF while using a legacy LTE USIM.

Figure 6:
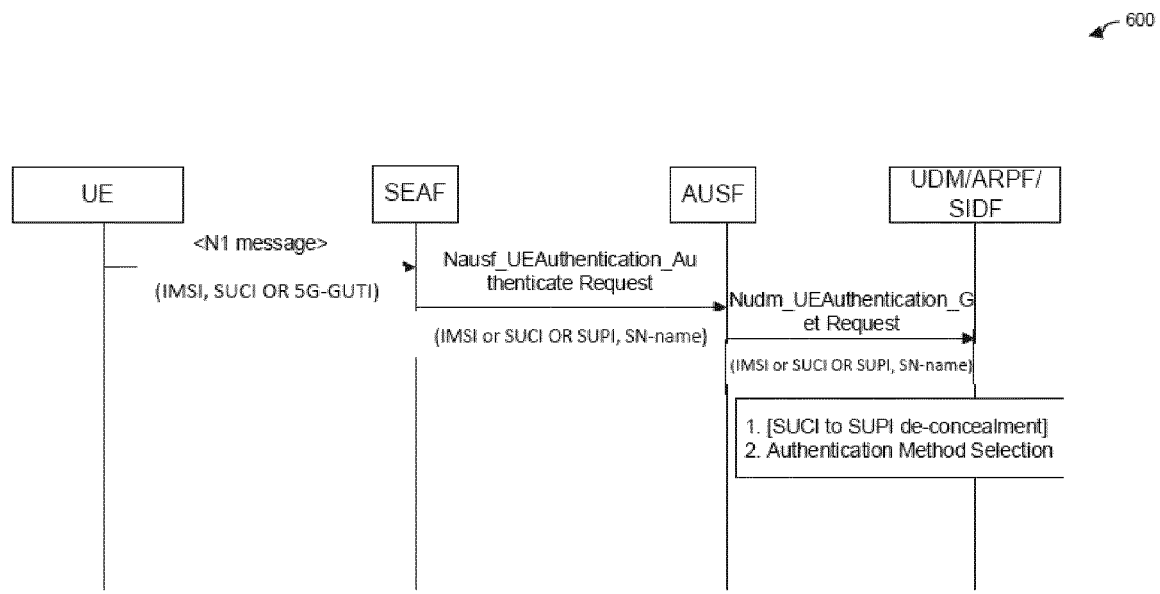
FIG. 6 illustrates a message flow for initiation of an authentication procedure and selection of an authentication method, according to an illustrative embodiment.

Further, consistent with procedure 400 above, FIG. 6 illustrates a message flow 600 for initiation of an authentication procedure and selection of an authentication method, according to an illustrative embodiment. Note that when the UE has a legacy USIM, it sends IMSI as the subscription identifier. SEAF in the AMF, AUSF and UDM conclude that the legacy USIM is being used for authentication of the UE from the subscription identifier format.

Still further, consistent with procedure 400 above, changes to the above-referenced 3GPP TS 33.501 are described below to support legacy UISM Authentication 5G AKA enhances EPS AKA by providing the home network with proof of successful authentication of the UE from the visited network. The proof is sent by the visited network in an Authentication Confirmation message.

5G AKA is applied within the 5G authentication framework whenever the UDM/ARPF has received a Nudm_UE-Authentication_Get Request message from the AUSF, and chosen 5G AKA as the authentication method, as compared with the above-referenced 3GPP TS 33.501.

5G AKA does not support requesting multiple AVs, nor does the SEAF support pre-fetching AVs from the home network for future use.

If a legacy LTE UISM is used in the UE, the Authentication is expected to happen using the IMSI as the subscription identifier. However, a unified subscription identifier format, such as described in the above-referenced U.S. patent application Ser. No. 17/045,370 entitled "Unified Subscription Identifier Management in Communication Systems, can contain either IMSI or SUPI or SUCI as the subscription identifier in the Authentication Request/Response messages. The AMF and SEAF will make a note of the subscription identifier as IMSI and will do the key mapping to the LTE key hierarchy during key derivation at the successful completion of authentication.

In 5G AKA there are two types of authentication vectors, namely the following:
- 5G HE AV: the 5G Home Environment Authentication Vector is the type of authentication vector(s) that is received by the AUSF from the UDM/ARPF in the Auth-info Resp. The 5G HE AV has the following fields: RAND, AUTN, XRES*, and $K_{AUSF}$.
- 5G AV: the 5G Authentication Vector is the type of authentication vector that the SEAF receives from the AUSF in the Nausf_UEAuthentication_Authenticate Response message. The 5G AV has the following fields: RAND, AUTN, HXRES*, and $K_{SEAF}$. The difference between the 5G HE AV and the 5G AV is that the XRES* is replaced by the HXRES* and that $K_{AUSF}$ is replaced by $K_{SEAF}$.

Figure 7:
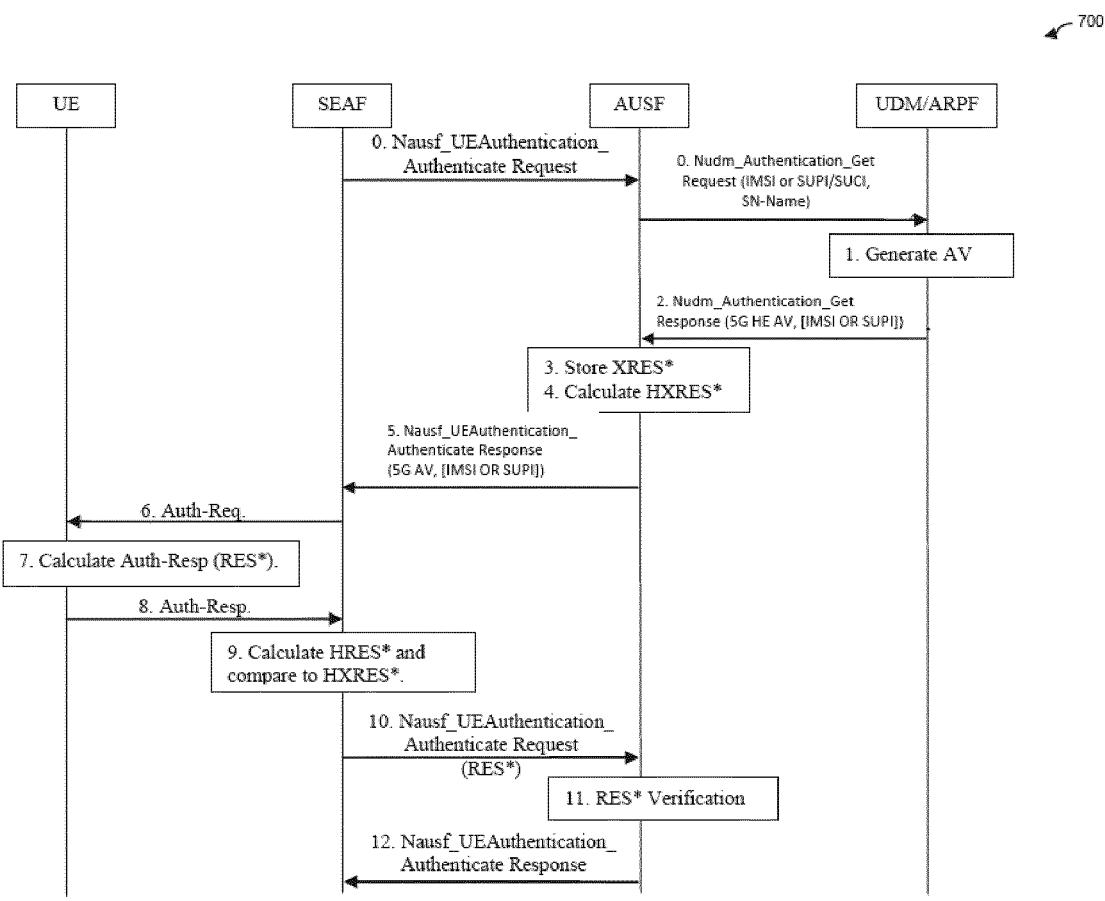
FIG. 7 illustrates a message flow for an authentication procedure, according to an illustrative embodiment.

FIG. 7 illustrates a message flow 700 for an authentication procedure, according to an illustrative embodiment. More particularly, FIG. 7 depicts an authentication procedure for 5G AKA. The numbered steps below correspond to the numbered steps in the figure.

0. The AUSF shall sends a Nudm_UEAuthentication_Get Request message to the UDM/ARPF. If SUCI was included in the Nudm_UEAuthentication_Get Request, UDM/SIDF de-conceals the SUPI and then chooses 5G AKA as the authentication method for the SUPI as described in the above-referenced 3GPP TS 33.501. If the UE uses a legacy USIM for authentication, instead of SUCI, IMSI is the subscription identifier.

1. For each Nudm Authenticate Get Request, the UDM/ARPF creates a 5G HE AV. The UDM/ARPF does this by generating an authentication vector (AV) with the Authentication Management Field separation bit set to "1" as defined in 3GPP TS 33.102, the description of which is incorporated by reference herein in its entirety. The UDM/ARPF then derives $K_{AUSF}$ and XRES*. Finally, the UDM/ARPF creates a 5G HE AV from RAND, AUTN, XRES*, and $K_{AUSF}$.

2. The UDM/ARPF then returns the 5G HE AV to the AUSF together with an indication that the 5G HE AV is to be used for 5G AKA in a Nudm_UEAuthentication_Get Response. In case the SUCI was included in the Nudm_UE-Authentication_Get Request, UDM includes the SUPI in the Nudm_UEAuthentication_Get Response.

3. The AUSF may store the XRES* temporarily until it expires. The AUSF may store the $K_{AUSF}$.

4. The AUSF then generates the 5G AV from the 5G HE AV received from the UDM/ARPF by computing the HXRES* from XRES* and $K_{SEAF}$ from $K_{AUSF}$, and replaces the XRES* with the HXRES* and $K_{AUSF}$ with $K_{SEAF}$ in the 5G HE AV. If the Nudm_UEAuthentication_Get Request in step 0 contained IMSI as the subscription identifier, the AUSF calculates a $K_{ASME}$ from CK, IK and SN id as defined in the above-referenced 3GPP TS 33.401.

5. The AUSF then returns the 5G AV (RAND, AUTN, HXRES*, $K_{SEAF}$) to the SEAF in a Nausf_UEAuthentication_Authenticate Response.

If the Nudm_UEAuthentication_Get Request in step 0 contained IMSI as the subscription identifier, the AUSF returns $K_{ASME}$ instead of $K_{SEAF}$ to the SEAF. In this case, SEAF does not derive the NAS key $K_{AMF}$ for the AMF, but it sends $K_{ASME}$ to be used as the NAS key $K_{NAS}$ to the AMF.

6. The SEAF sends RAND, AUTN to the UE in a NAS message Auth-Req. This message also includes the ngKSI that is used by the UE and AMF to identify the $K_{AMF}$ and the partial native security context that is created if the authentication is successful. The ME forwards the RAND and AUTN received in NAS message Auth-Req to the USIM.

7. At receipt of the RAND and AUTN, the USIM verifies the freshness of the authentication vector by checking whether AUTN can be accepted as described in the above-referenced 3GPP TS 33.102. If so, the USIM computes a response RES. The USIM returns RES, CK, IK to the ME. If the USIM computes a Kc (i.e., GPRS Kc) from CK and IK using conversion function c3 as described in the above-referenced 3GPP TS 33.102, and sends it to the ME, then the ME ignores such GPRS Kc and does not store the GPRS Kc on USIM or in ME. The ME then computes RES* from RES. The UE calculates $K_{SEAF}$ from $K_{AUSF}$.

If the UE is using a legacy USIM, it calculates $K_{ASME}$ as defined in the above-referenced 3GPP TS 33.401 and sets $K_{ASME}$ as the NAS key, skipping the computation of $K_{AUSF}$ and $K_{SEAF}$.

8. An ME accessing 5G checks during authentication that the separation bit in the AMF field of AUTN is set to "1". The separation bit is bit 0 of the AMF field of AUTN. Note that this separation bit in the AMF field of AUTN cannot be used anymore for operator specific purposes as described by the above-referenced 3GPP TS 33.102.

The UE returns RES* to the SEAF in a NAS message Auth-Resp.

9. The SEAF then computes HRES* from RES*, and the SEAF compares HRES* and HXRES*. If they coincide, the SEAF considers the authentication successful. If not, the SEAF proceeds as described in the above-referenced 3GPP TS 33.501.

10. The SEAF sends RES*, as received from the UE, in a Nausf_UEAuthentication_Authenticate Request message (containing the SUPI or SUCI and the serving network name SN-Name) to the AUSF.

If the UE is using a legacy USIM, SEAF sends the Nausf_UEAuthentication_Authenticate Request message containing IMSI instead of SUCI or SUPI and the serving network id.

11. When the AUSF receives the Nausf_UEAuthentication_Authenticate Request message including a RES*, it verifies whether the AV has expired. If the AV has expired, the AUSF considers the confirmation unsuccessful. AUSF compares the received RES* with the stored XRES*. If the RES* and XRES* are equal, the AUSF considers the confirmation message as successfully verified.

12. The AUSF indicates to the SEAF in the Nausf_UEAuthentication_Authenticate Response whether the confirmation was successful or not. In case the AUSF received a SUCI from the SEAF when the authentication was initiated, and if the confirmation was successful, then the AUSF also includes the SUPI in 5G-AKA.

If the UE is using a legacy USIM, AUSF indicates to the SEAF in the Nausf_UEAuthentication_Authenticate Response the IMSI it received from the UDM.

If the authentication was successful, the key $K_{SEAF}$ received in 5G AV becomes the anchor key in the sense of the key hierarchy. Then, the SEAF derives the $K_{AMF}$ from the $K_{SEAF}$ and the SUPI and provides the ngKSI and the $K_{AMF}$ to the AMF.

If a SUCI was used for this authentication, then the SEAF only provides ngKSI and KAMF to the AMF after it receives the 5G-ACA message containing SUPI. No communication services are provided to the UE until the SUPI is known to the serving network.

The further steps taken by the AUSF upon receiving a successfully verified confirmation message are described in the above-referenced 3GPP TS 33.501.

If the UE is using a legacy USIM, UE considers the key $K_{ASME}$ as the anchor key, and SEAF considers the $K_{SEAF}$ (otherwise same as $K_{ASME}$, received from AUSF) as the anchor key.

It should therefore again be emphasized that the various embodiments described herein are presented by way of illustrative example only and should not be construed as limiting the scope of the claims. For example, alternative embodiments can utilize different communication system configurations, user equipment configurations, base station configurations, key pair provisioning and usage processes, messaging protocols and message formats than those described above in the context of the illustrative embodiments. These and numerous other alternative embodiments within the scope of the appended claims will be readily apparent to those skilled in the art.

What is claimed is:

1. An apparatus comprising:

at least one processor, at least one memory storing instructions that, when executed by the at least one processor, cause the apparatus at least to:

access to a first communication network, wherein the apparatus comprises a subscriber identity module configured for a second communication network, and wherein the second communication network is a legacy network with respect to the first communication network;

initiate an authentication procedure with at least one network entity of the first communication network and select an authentication method to be used during the authentication procedure, wherein the selected authentication method comprises a legacy authentication method of the second communication network; and participate in the authentication procedure with the at least one network entity using the selected authentication method and, upon successful authentication, obtain a set of keys to enable the apparatus to access the first communication network;

wherein the set of keys comprises one or more keys generated as part of the legacy authentication method of the second communication network which are used as at least a subset of the keys that would be generated as part of one or more authentication methods of the first communication network; and wherein the one or more keys generated as part of the legacy authentication method of the second communication network are usable, as generated, in place of the keys that would be generated as part of the one or more authentication methods of the first communication network.

2. The apparatus of claim 1, wherein to initiate an authentication procedure, the instructions, when executed by the at least one processor, cause the apparatus to initiate a network attach procedure and to form an initial registration request message.

3. The apparatus of claim 2, wherein to form the initial registration request message, the instructions, when executed by the at least one processor, cause the apparatus to request one or more subscription parameters from a subscriber identity module application in a universal integrated circuit card portion of the apparatus.

4. The apparatus of claim 3, wherein the instructions, when executed by the at least one processor, further cause the apparatus to receive a permanent subscription identifier associated with the second communication network as the subscription identifier from the universal integrated circuit card portion of the apparatus.

5. The apparatus of claim 4, wherein the permanent subscription identifier comprises an International Mobile Subscriber Identity.

6. The apparatus of claim 4, wherein the apparatus forms the initial registration request message which comprises the permanent subscription identifier in unencrypted form.

7. The apparatus of claim 6, wherein the apparatus sends the initial registration request message to the at least one network entity.

8. The apparatus of claim 7, wherein the at least one network entity comprises an access and mobility management function.

9. The apparatus of claim 7, wherein the initial registration request message is recognized by the at least one network entity as originating from the apparatus comprising a subscriber identity module configured for the second communication network.

10. The apparatus of claim 9, wherein, in response to an authentication request from the at least one network entity, at least another network entity is configured to attempt to authenticate the apparatus using an authentication procedure associated with the first communication network.

11. The apparatus of claim 10, wherein the at least another network entity comprises an authentication server function.

12. The apparatus of claim 10, wherein the at least another network entity communicates with a network entity associated with a home network of the apparatus to attempt to authenticate the apparatus.

13. The apparatus of claim 7, wherein to participate in the authentication procedure, the instructions, when executed by the at least one processor, further cause the apparatus to receive an authentication request from the at least one network entity.

14. The apparatus of claim 13, wherein the instructions, when executed by the at least one processor, further cause the apparatus to compute an authentication response based on the received authentication request.

15. The apparatus of claim 1, wherein the set of keys comprises one or more keys corresponding to a key mapping between the apparatus and the at least one network entity.

16. The apparatus of claim 15, wherein the first communication network comprises a fifth generation system and the second communication comprises a fourth generation long term evolution system.

17. The apparatus of claim 16, wherein the key mapping comprises $K_{ASME}=K_{AMF}$ and $K_{eNB}=K_{gNB}$.

18. In a communication system including an apparatus seeking access to a first communication network, wherein the apparatus comprises a subscriber identity module configured for a second communication network, and wherein the second communication network is a legacy network with respect to the first communication network, a method comprising:

initiating an authentication procedure with at least one network entity of the first communication network and selecting an authentication method to be used during the authentication procedure, wherein the selected authentication method comprises a legacy authentication method of the second communication network; and participating in the authentication procedure with the at least one network entity using the selected authentication method and, upon successful authentication, the apparatus obtaining a set of keys to enable the apparatus to access the first communication network;

wherein the set of keys comprises one or more keys generated as part of the legacy authentication method of the second communication network which are used as at least a subset of the keys that would be generated as part of one or more authentication methods of the first communication network; and wherein the one or more keys generated as part of the legacy authentication method of the second communication network are usable, as generated, in place of the keys that would be generated as part of the one or more authentication methods of the first communication network.

19. The method of claim 18, wherein the initiating an authentication procedure further comprises initiating a network attach procedure and forming an initial registration request message.

20. In a communication system including an apparatus seeking access to a first communication network, wherein the apparatus comprises a subscriber identity module configured for a second communication network, and wherein the second communication network is a legacy network with respect to the first communication network, a method, performed by a network entity associated with the first communication network comprising:

receiving a registration request message from the apparatus and initiating an authentication procedure to select an authentication method to be used during the authentication procedure, wherein the selected authentication method comprises a legacy authentication method of the second communication network; and participating in the authentication procedure with the apparatus using the selected authentication method such that, upon successful authentication, the network entity sends a set of keys to enable the apparatus to access the first communication network;

wherein the set of keys comprises one or more keys generated as part of the legacy authentication method of the second communication network which are used as at least a subset of the keys that would be generated as part of one or more authentication methods of the first communication network; and wherein the one or more keys generated as part of the legacy authentication method of the second communication network are usable, as generated, in place of the keys that would be generated as part of the one or more authentication methods of the first communication network.

* * * * *